United States Patent
Dungworth et al.

(10) Patent No.: US 7,544,401 B2
(45) Date of Patent: Jun. 9, 2009

(54) INK JET RECORDING MEDIUM

(75) Inventors: Howard Roger Dungworth, Huddersfield (GB); Andrew J. Naisby, Yorktown Heights, NY (US); Joseph Suhadolnik, Yorktown Heights, NY (US); David A. Yale, White Plains, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 629 days.

(21) Appl. No.: 10/493,338

(22) PCT Filed: Oct. 24, 2002

(86) PCT No.: PCT/EP02/11920

§ 371 (c)(1),
(2), (4) Date: Oct. 20, 2004

(87) PCT Pub. No.: WO03/037641

PCT Pub. Date: May 8, 2003

(65) Prior Publication Data

US 2005/0048227 A1    Mar. 3, 2005

Related U.S. Application Data

(60) Provisional application No. 60/406,441, filed on Aug. 28, 2002, provisional application No. 60/338,534, filed on Nov. 29, 2001, provisional application No. 60/336,280, filed on Nov. 2, 2001.

(51) Int. Cl.
*B41M 5/00* (2006.01)

(52) U.S. Cl. .............. 428/32.29; 428/32.1; 428/32.13; 428/32.14; 428/32.24; 523/160; 523/161; 526/258; 526/310; 526/319; 526/323.2

(58) Field of Classification Search ............. 428/32.1, 428/32.13, 32.14, 32.24, 32.29; 523/160, 523/161; 526/258, 310, 319, 323.2
See application file for complete search history.

(56) References Cited

U.S. PATENT DOCUMENTS

| | | | | |
|---|---|---|---|---|
| 3,671,502 | A | * 6/1972 | Samour et al. | 526/287 |
| 4,503,111 | A | 3/1985 | Jaeger et al. | 428/195 |
| 4,575,465 | A | 3/1986 | Viola | 427/261 |
| 4,935,307 | A | 6/1990 | Iqbal et al. | 428/500 |
| 5,206,071 | A | 4/1993 | Atherton et al. | 428/195 |
| 5,472,757 | A | * 12/1995 | Ogawa et al. | 428/32.24 |
| 5,478,631 | A | 12/1995 | Kawano et al. | 428/212 |
| 5,707,722 | A | * 1/1998 | Iqbal et al. | 428/32.24 |
| 5,866,638 | A | * 2/1999 | Shimomura et al. | 523/161 |
| 5,973,026 | A | * 10/1999 | Burns et al. | 523/160 |
| 6,001,482 | A | * 12/1999 | Anderson et al. | 428/32.24 |
| 6,089,704 | A | * 7/2000 | Burns et al. | 428/32.23 |
| 6,096,826 | A | 8/2000 | Rabasco et al. | 525/61 |
| 6,127,037 | A | 10/2000 | Sargeant et al. | 428/411.1 |
| 6,133,391 | A | * 10/2000 | Nielson et al. | 206/524 |
| 6,276,792 | B1 | * 8/2001 | Gundlach et al. | 347/101 |
| 6,313,246 | B1 | 11/2001 | Carter et al. | 526/258 |

FOREIGN PATENT DOCUMENTS

| | | |
|---|---|---|
| EP | 0869010 | 5/1999 |
| JP | 2000-272233 | 10/2000 |
| WO | 00/37259 | 6/2000 |

OTHER PUBLICATIONS

Patent Abstracts of Japan vol. 2000, No. 13, (2001) for JP 2000272233.
Ciba Specialty Chemicals Copending Application No. 10/499,854 (2002).
Ciba Specialty Chemicals Copending Application No. 10/499,855 (2002).
Ciba Specialty Chemicals Application No. 60/486,060 (2003).
Ciba Specialty Chemicals Application No. 60/488,341 (2003).

* cited by examiner

*Primary Examiner*—Bruce H Hess
*Assistant Examiner*—David J Joy
(74) *Attorney, Agent, or Firm*—Tyler A. Stevenson

(57) ABSTRACT

An ink jet recording media system is described which comprises at least one coating layer that comprises a zwitterionic polymer or oligomer. The media system exhibits excellent light fastness as well as good dry time and good image-forming properties.

12 Claims, No Drawings

INK JET RECORDING MEDIUM

This is a national stage application of international application No. PCT/EP2002/11920, filed Oct. 24, 2002, which claims the benefit under 35 USC 119(e) of U.S. application Ser. Nos. 60/406,441, filed Aug. 28, 2002, 60/338,534, filed Nov. 29, 2001 and 60/336,280, filed Nov. 2, 2001.

This invention relates to ink jet recording media, and particularly to novel ink jet coating layers that comprise certain zwitterionic polymers or oligomers.

Ink jet printing technology is used for example for presentation (transparency), graphic arts, engineering drawing and home office applications. The performance requirements for ink jet recording media used for these applications include efficient ink absorption, fast drying, good colorfastness, high image resolution, archivability and curl performance.

The individual layers that receive ink jet ink images are referred to as ink jet media or ink jet receivers. Ink jet media may simply consist or cellulosic fiber paper or of cellulosic fibers and a filler in order that inks may be absorbed in the space between fibers.

Ink jet recording papers may also be of the coated type, which consists for example of a paper (or support), an ink-receptive layer or ink-absorbing layer or layers, and optionally a protective coating layer. The ink-receptive layer is the ink-receiving or image drying layer. Thin protective coating layers are typically employed to provide physical protection for the underlying layer or to protect the image. Protective layers may reduce tackiness, provide a glossy appearance, and like other layers, offer an ink-receptive surface that may serve as a carrier for specific components of the ink.

A barrier layer between a paper support and the ink receptive layer or layers is also typically employed.

Attempts have been made to employ certain polymers or blends of polymers as components of ink jet recording media. In general, blends are used to find the proper balance of ink absorption, dry time and image permanence.

U.S. Pat. No. 4,503,111 teaches a recording media which is a coating that comprises a polyvinylpyrrolidone and a matrix-forming hydrophilic polymer selected from gelatin and polyvinyl alcohol.

U.S. Pat. No. 4,575,465 discloses ink jet transparencies that comprise a transparent support carrying a layer comprising a vinylpyridine/vinylbenzyl quaternary salt copolymer and a hydrophilic polymer selected from gelatin, polyvinyl alcohol and hydroxypropyl cellulose.

U.S. Pat. No. 4,935,307 discloses an ink receptive layer that comprises (a) at least one water absorbing, hydrophilic polymeric material, (b) at least one hydrophobic polymeric material incorporating acid functional groups and (c) at least one polyethylene glycol.

U.S. Pat. No. 5,206,071 teaches an ink jet film composite comprising a support, a water-insoluble, water-absorptive and ink-receptive matrix layer, which matrix layer comprises a hydrogel complex and a polymeric high molecular weight quaternary ammonium salt.

U.S. Pat. No. 6,096,826 teaches the use of piperidone modified poly(vinyl alcohol) in ink jet paper coating applications.

U.S. Pat. No. 6,127,037 teaches an ink jet recording media layer that comprises polyalkyl or polyphenyl oxazoline polymers in addition to a hydrophilic, water-insoluble polymer or copolymer.

WO 0037259 teaches ink jet media comprising a support, an ink-receptive layer and a top layer that comprises a polymer that contains both a hydrophilic component and a hydrophobic component, or a mixture of two or more such polymers.

EP 0869010 discloses ink-receiving layers in ink jet media that comprise at least one copolymer containing primary or secondary amino groups and vinyl ester derived hydroxy groups. Monomers leading to the hydroxy containing group are vinyl esters such as vinyl propionate. Monomers leading to the amino containing group are vinyl amides.

U.S. Pat. No. 6,313,246 discloses the use of certain zwitterionic polymers as retention and drainage aids in the manufacture of paper and as a flocculant in the papermaking process.

There is still a need to balance the requirements of ink jet media, specifically, to achieve ink jet media with excellent light fastness while retaining good ink absorption and dry time.

This objective has been achieved with the use of certain zwitterionic polymers or oligomers in one or more layers of Ink jet media.

Thus, the present invention relates to an ink jet recording media system that comprises a support and one or more coating layers thereon, wherein at least one coating layer comprises a zwitterionic polymer or oligomer.

For the purposes of this invention, the terms "ink jet media", "ink jet recording media" or "ink jet media system" or "ink jet recording media system" refers to the entire composition which receives the ink jet ink, or likewise also refers to any individual layers or combinations of individual layers of the entire composition.

The term "ink receptive layer" means the ink-receiving or image-forming layer. The ink receptive layer can be considered as a sponge layer intended for the absorption of the ink.

The term "protective coating layer" means a top coating layer of the ink jet media system, or overcoat layer, that may be employed to provide specific properties as outlined above. Protective coating layers are typically thin in comparison to the ink-receptive layer. The protective coating layer is the outermost layer, and must allow for ink penetration or may be applied in a subsequent lamination step.

The term "support" refers to the base substrate of the ink jet media, for example paper itself. The present supports are naturally occurring materials or are synthetic.

Zwitterionic polymers and copolymers useful in this invention are disclosed for example in U.S. Pat. No. 6,313,246, the relevant disclosure of which is hereby incorporated by reference.

The present zwitterionic polymers or oligomers are derived from 0 to about 99.9% of at least one nonionic monomer and from about 100 to about 0.1% of at least one zwitterionic monomer.

The present zwitterionic polymers or oligomers may be derived from one or more than one nonionic monomer and one zwitterionic monomer; or may be derived from one nonionic monomer and one or more than one zwitterionic monomer; or may be derived from more than one nonionic monomer and more than one zwitterionic monomer.

The present zwitterionic polymers or oligomers may be homopolymers or homooligomers, or may be copolymers or cooligomers.

The present zwitterionic monomers are for example selected from the formulae

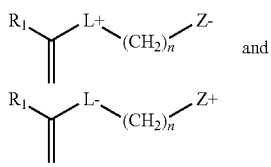

wherein
L⁺ is a group of formula

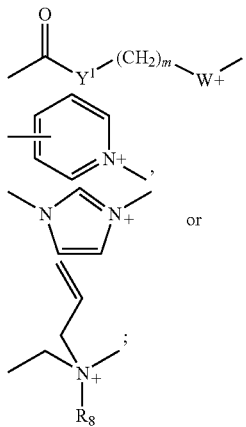

L⁻ is a group of formula

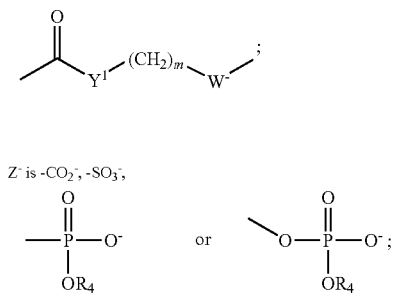

$Z^-$ is $-CO_2^-$, $-SO_3^-$,

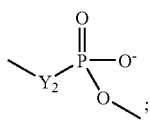

$Z^+$ is $N^+R_5R_6R_7$;

$R_1$ and $R_8$ are independently hydrogen or methyl;
$W^+$ is $-S^+R_3-$ or $-N^+R_2R_3-$;
$W^-$ is

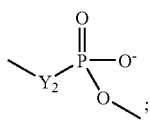

$Y_1$ and $Y_2$ are independently selected from $-O-$ or $-NR_2$;
$R_2, R_3, R_4, R_5, R_6$ and $R_7$ are independently selected from hydrogen and straight or branched chain alkyl of 1 to 4 carbon atoms;
m is 2 or 3; and
n is 1-5.

Alkyl is for instance methyl, ethyl, n-propyl, iso-propyl, n-, sec-, iso- and tert-butyl.

Zwitterionic means a molecule containing cationic and anionic substituents in equal proportions, so that the molecule is net neutral in charge overall.

The monomers according to this invention are polymerizable allylic, vinylic or acrylic compounds.

Nonionic monomers are electrically neutral. Representative are acrylamide, methacrylamide, N-methylacrylamide, N,N-dimethyl(meth)acrylamide, N-isopropyl(meth)-acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol)monomethyl ether mono(meth)acrylate, N-vinyl-2-pyrrolidone, glycerol mono((meth)acrylate), 2-hydroxyethyl(meth)acrylate, vinyl methylulfone, vinyl acetate, diacetone acrylamide, and acrylates such as methylmethacrylate, acrylic acid, hydroxyethylmethacrylate (HEMA), amino acrylates and amino methacrylates and associative monomers.

Amino methacrylates are for example: dimethylaminoethylmethacrylate and tert-butylaminoethylmethacrylate. Associative monomers are for example stearil ethoxy (20) methacrylate and stearyl ethoxy (10) allyl ether.

Suitable nonionic monomers of this invention are for instance acrylamide, methacrylamide, methylmethacrylate and hydroxyethylmethacrylate (HEMA).

Zwitterionic monomers are polymerizable molecules that contain cationic and anionic functionalities in equal proportions, so that the molecules are electrically net overall neutral. Examples are:

N,N-dimethyl-N-acryloyloxyethyl-N-(3-sulfopropyl)-ammonium betaine,

N,N-dimethyl-N-acryloyloxyethyl-N-(2-carboxymethyl)-ammonim betaine,

N,N-dimethyl-N-acrylamidopropyl-N-(3-sulfopropyl)-ammonium betaine.,

N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'(trimethylammonim)ethyl phosphate,

[(2-acryloxylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl)carboxymethyl methylsulfonium chloride, 1-(3-sulfoproyl)-2-vinylpyridinium betaine, N-(4-sulfobutyl)-N-methyl-N,N-diallylamine ammonium betaine (MDABS), N,N-diallyl-N-methyl-N-(2-sulfoethyl)ammonium betaine, and the like.

Zwitterionic polymers or oligomers are derived from zwitterionic monomers, and possibly, other nonionic monomer(s). They include for example homopolymers such as the homopolymer of N,N-dimethyl-N-(2-acryloyloxyethyl)-N-(3-sulfopropyl)ammonium betaine, copolymers such as the copolymer of acrylamide and N,N-dimethyl-N-(2-acryloyloxyethyl)-N-(3-sulfopropyl)ammonium betaine, and terpolymers such as the terpolymer of acrylamide, N-vinyl-2-pyrrolidone, and 1-(3-sulfopropyl)-2-vinylpyridinium betaine.

In zwitterionic polymers, all the polymer chains and segments within those chains are rigorously electrically neutral. Therefore, zwitterionic polymers represent a subset of polyampholytes, necessarily maintaining charge neutrality across all polymer chains and segments because both anionic charge and cationic charge are introduced within the same zwitterionic monomer.

The zwitterionic monomers of this invention are prepared according to the methods described in WO 01/04201.

They are prepared according to the following general schemes in an appropriate organic solvent at an appropriate temperature and reaction time:

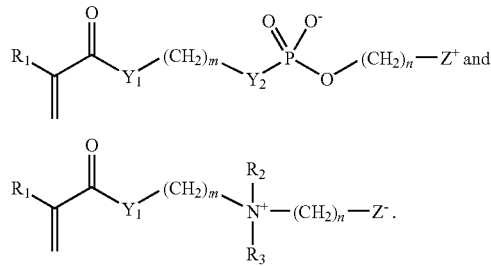

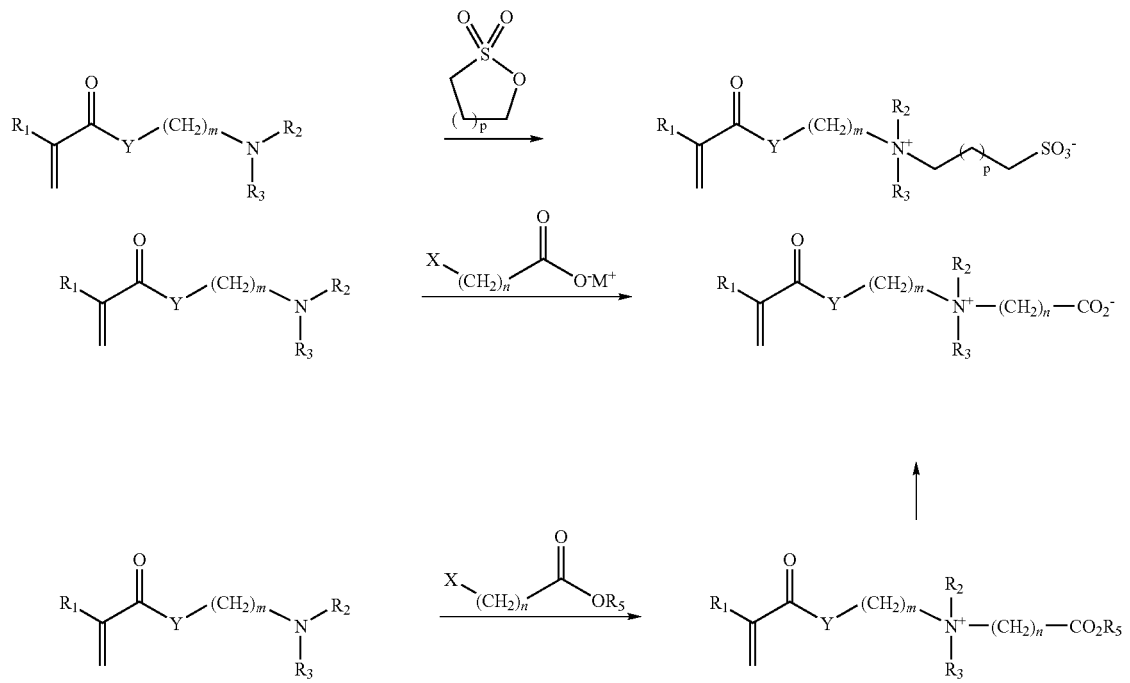

In the above synthetic schemes, X is any leaving group which may be displaced by the nucleophilic nitrogen of the amine reactants. For example, X may be halogen, tosylate, mesylate and the like. $M^+$ is a positive counterion, for example a metal ion such as sodium or postassium. Y is defined for $Y_1$ or $Y_2$ above and p is 1 or 2.

The present zwitterionic polymers or oligomers of this invention are for example copolymers or cooligomers of at least one nonionic monomer selected from the group consisting of acrylamide methylmethacrylate and hydroxyethylmethacrylate and a zwitterionic monomer selected from

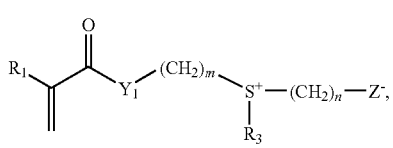

The zwitterionic polymers or oligomers of this invention are for example copolymers or cooligomers of at least one nonionic monomer selected from the group consisting of acrylamide methylmethacrylate and hydroxyethylmethacrylate and at least one zwitterionic monomer selected from the group consisting of N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-methacryloyloxyethyl-N-(3-sulfopropyl)-ammonium betaine, N,N-dimethyl-N-methacrylamidopropyl-N-(3-sulfopropyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate and

[(2-acryloylethyl)dimethylammonio]methyl phosphonic acid.

For example, the zwitterionic polymers or oligomers of this invention are copolymers or cooligomers of at least one nonionic monomer selected from the group consisting of acrylamide, methylmethacrylate and hydroxyethylmethacrylate and a zwitterionic monomer selected from
N,N-dimethyl-N-acryloyloxyethyl-N-(3-sulfopropyl)-ammonium betaine,
N,N-dimethyl-N-acrylamidopropyl-N-(2-carboxymethyl)-ammonium betaine,
N,N-dimethyl-N-methacryloyloxyethyl-N-(3-sulfopropyl)-ammonium betaine and
N,N-dimethyl-N-methacrylamidopropyl-N-(3-sulfopropyl)-ammonium betaine.

For example, the zwitterionic monomer is selected from
N,N-dimethyl-N-methacrylamidopropyl-N-(3-sulfopropyl)-ammonium betaine and
N,N-dimethyl-N-methacryloyloxyethyl-N-(3-sulfopropyl)-ammonium betaine, which are

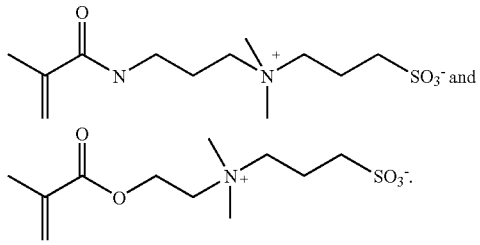

The copolymers or cooligomers of this invention are prepared for example as in the disclosure of WO 01/04201. They may be prepared for example by polymerization within a dispersed phase, for example inverse emulsion polymerization or dispersion polymerization. They may also be prepared by gel polymerization to produce the polymer product as a dry powder.

The zwitterionic polymers or oligomers of this invention may be of any molecular weight. They may for example have a molecular weight of about 10,000 to about 2 million.

The zwitterionic polymers or oligomers of this invention are advantageously employed in any layer of an ink jet ink recording media system. They may be employed in one coating layer, more than one of the layers, or in all of the layers.

The support itself may be the ink jet ink receptive layer. In this instance zwitterionic polymers or oligomers are advantageously employed as a coating directly on the support.

Accordingly, an object of this invention is an ink jet media system which comprises a coating directly on a support, wherein the coating comprises a zwitterionic polymer or oligomer.

The ink jet media systems of this invention may comprise one or more than one ink jet receptive layer. The present zwitterionic polymers or oligomers may advantageously be employed in one or more than one of the receptive layers.

Accordingly, another object of the invention is an ink jet media system which comprises a support and at least one ink jet ink receptive layer,
wherein one or more than one of said layers comprises a zwitterionic polymer or oligomer.

Another object of the invention is an ink jet media system which comprises a support, at least one ink jet ink receptive layer, and a protective coating layer, which protective coating layer comprises a zwitterionic polymer or oligomer.

Another object of the invention is an ink jet media system which comprises a support, at least one ink jet ink receptive layer, and a barrier layer between the support and the ink receptive layer or layers,
wherein one or more than one of said receptive layers comprises a zwitterionic polymer or oligomer.

It is also contemplated that zwitterionic polymers or oligomers are advantageously employed as a component of the ink jet ink.

Accordingly, another object of the invention is an ink jet media system which comprises ink jet ink and a zwitterionic polymer or oligomer.

Supports are for example paper or a transparent plastic. Supports also include translucent plastics, matte plastics, opaque plastics, papers, and the like.

Supports may be for example cellulose esters, cellulose acetate, polyesters, polystyrene, polyethylene, poly(vinyl acetate), polypropylene, polycarbonate, polymethacrylic acid and methyl and ethyl esters, polyamides such as nylons, polyesters such as poly(ethylene terephthalate) (PET), polyimides, polyethers, polyvinyl chloride and polysulfonamides.

Barrier layers are advantageously employed between a paper support and the ink receptive layer. The barrier layer is for example polyolefin, for instance polyethylene. The barrier layer may also be a metal foil, such as aluminum foil.

Coating layers comprising the zwitterionic polymers and oligomers of this invention are cured with any conventional technique. For example, the present coating layers are cured air dried under ambient conditions, are oven-cured, or are photo-cured.

The zwitterionic polymers and oligomers of this invention is that they may be blended with a wide variety of polymers or oligomers employed in ink jet media systems, for example neutral, anionic and cationic polyvinylalcohol (PVOH) and gelatin.

Polymers typically employed in ink jet media systems, generally in the ink receptive layer, include gelatin, starch, styrene butadiene rubber latex, nitrile butadiene rubber latex, polyethylene glycol, polyacrylamide, polyvinylalcohol, vinyl alcohol/vinyl acetate copolymer, methyl cellulose, hydroxymethyl cellulose, hydroxyethyl cellulose, hydroxypropy methyl cellulose, hydroroxypropyl ethyl cellulose, hydroxyethyl methyl cellulose, carboxymethyl cellulose and poly(N-vinyl pyrrolidone).

The zwitterionic polymers and oligomers of this invention are advantageously employed with cationic polymers, for example cationic polymers derived for example from one or more monomers selected from quaternary or acid salts of dialkylaminoalkyl acrylates and methacrylates, the quaternary or acid salts of dialkylaminoalkylacrylamides and methacrylamides, N,N-diallyldialkyl ammonium halides, Mannich products, and the like. Representative are N,N-dimethylaminoethylacrylate methyl chloride quaternary salt (DMAEA.MCQ), diallyldimethylammonium chloride (DADMAC), and the like.

Other suitable components may be present in the ink jet media systems and coatings of the present invention.

Additional components include for example pigments and fillers, for example amorphous and crystalline silica, aluminum trihydrate, kaolin, talcum, chalk, betonite, zeolites, glass beads, calcium carbonate, potassium sodium aluminum silicate, diatomaceous earth, silicates of aluminum and magnesium and mixtures thereof. Titanium doxide may also be used for certain applications. Organic particulates which may be employed include polyolefins, polystyrene, polyurethane, starch, poly(methyl methacrylate) and polytetrafluoroethylene. Pigments, fillers and organic particulates may be employed in coating layers of the present invention from about 0.1 to about 15% by weight, based on the weight of the dry coating. Polyolefins are for example polypropylene or polyethylene.

The present zwitterionic polymers and oligomers may advantageously be employed as a binder or part of a binder for a nanoporous or microporous ink jet media system. As known in the art, the binder may comprise a minority of the coating layer, for example less than about 40% by weight, for Instance less than about 25% by weight, or less than about 10% by weight.

Paper substrates are for example advantageously coated with clay.

Additional additives also include surface active agents which control wetting or spreading action of the coating mixture, antistatic agents, thickeners, suspending agents, particulates which control the frictional properties or alter the reflective properties or act as spacers, pH controlling compounds, light stabilizers, antioxidants, humectants, bacteriostats, crosslinking agents, optical brighteners, etc.

Specific examples are starch, xanthan gum, quaternary ammonium salts, chitin, cellulose derivatives, and water soluble metal salts, for instance salts of Ca, Ba, Mg or salts of the rare earth metal series.

Stabilizer systems have been developed for the ink colorants. These stabilizers are also employed in the ink jet media systems of the present invention. They are disclosed for example in U.S. Pat. Nos. 5,782,963 and 5,855,655, the relevant disclosures of which are hereby incorporated by reference.

Additional additives that are advantageously employed as components of coating layers of an ink jet media system include those of the known classes of polymer stabilizers. For example, polymer stabilizers selected from the group consisting of ultraviolet light absorbers, hindered amine light stabilizers (HALS), and antioxidants.

For example, suitable additional additives are selected from:

Antioxidants selected from the group consisting of alkylated monophenols, alkylthiomethylphenols, hydroquinones and alkylated hydroquinones, tocopherols, hydroxylated thiodiphenyl ethers, alkylidenebisphenols, hindered phenols derived from benzyl compounds, hydroxybenzylated malonates, aromatic hydroxybenzyl compounds, triazine-based hindered phenols, benzylphosphonates, acylaminophenols, esters of β-(3,5-di-tert-butyl-4-hydroxyphenyl)propionic acid with mono- or polyhydric alcohols, esters of β-(5-tert-butyl-4-hydroxy-3-methylphenyl)propionic acid with mono- or polyhydric alcohols, esters of β-(3,5-dicyclohexyl-4-hydroxyphenyl)propionic acid with mono- or polyhydric alcohols, esters of 3,5-di-tert-butyl-4-hydroxyphenyl acetic acid with mono- or polyhydric alcohols, amides of β-(3,5-di-tert-butyl-4-hydroxyphenyl)propionic acid, ascorbic acid and aminic antioxidants, for example N,N'-di-isopropyl-p-phenylenediamine.

Antioxidants are for example phenolic antioxidants, for example salts of hydroxy substituted benzoic acids, for example salts of salicylic acid and salts of hydroxyl substituted benzoic acids further substituted with alkyl groups.

UV absorbers and light stabilizers selected from the group consisting of 2-(2-hydroxyphenyl)-2H-benzotriazoles, for example known commercial hydroxyphenyl-2H-benzotriazoles, 2-hydroxybenzophenones, esters of substituted and unsubstituted benzoic acids, for example 4-tertbutyl-phenyl salicylate, acrylates and malonates, oxamides, tris-aryl-o-hydroxyphenyl-s-triazines and sterically hindered amine stabilizers, for example N—H, N-acyl, N-oxyl, N-hydroxyl, N-alkyl, N-alkoxy and N-hydroxyalkoxy hindered amines.

For example, the nitroxyl, hydroxylamine and hydroxylamine salt stabilizers as disclosed in U.S. Pat. No. 6,254,724 are advantageously used in the recording media of the present invention. The relevant parts of U.S. Pat. No. 6,254,724 are hereby incorporated by reference.

For instance, UV absorbers are advantageously employed in protective coating layers of the present invention, whether the protective coating layer is part of the prepared recording media system or whether it is applied in a subsequent lamination step.

Another object of the present invention is a method for preparing an ink jet media system, which method comprises applying one or more coating layers on a support,
wherein at least one of the coating layers comprises a zwitterionic polymer or oligomer.

Any known method may be employed in the application of the individual coating layers of the present ink jet media systems. Known methods are for example Mayer bar coating, reverse roll coating, roller coating, wire-bar coating, dip-coating, air-knife coating, slide coating, curtain coating, doctor coating, flexographic coating, wound wire coating, slot coating, slide hopper coating and gravure coating.

Inks for ink jet printing are well known. These inks comprise a liquid vehicle and a dye or pigment dissolved or suspended therein. The liquid vehicle employed comprises water or a mixture of water and a water miscible organic solvent. The inks may also be vehicles for additives or other components that are to be incorporated into the recording media system.

Protective coating layers are typically about 1 micron thick. Supports are typically from about 12 microns to about 500 microns thick. Ink receptive layers are typically about 0.5 to about 30 microns thick.

The following Examples are for illustrative purposes only and are not to be construed as limiting the present invention in any manner whatsoever.

EXAMPLE 1

Dye Lightfastness

Aqueous solutions/suspensions of media polymers are applied to polyethylene coated paper sheet using the appropriate draw down bar to generate a 15 gsm (grams per square meter) coating after drying. The media polymer coatings are dried either under ambient conditions, 24 hrs at room temperature, or In an oven, 3 minutes at 180° F.

IMAGE GEL 8394 and IMAGE GEL 8396 are state of the art gelatin polymers for ink jet receptive media, available from Kind and Knox.

In the present Example, the polymers of this invention are acrylamide/N,N-dimethyl-N-methacryloyloxyethyl-N-(3-sulphopropyl)ammonium betaine copolymers in an 85/15 w/w ratio. The solutions also contain 1% by weight LODYNE amphoteric fluorosurfactant based on the copolymer solids. The present polymers are identified by their molecular weights: 279K (279,000) and 1 MM (1 million).

Color sqares of yellow, magenta and cyan at both 50% and 100% optical densities are printed onto the coated papers using the HP 970 Cxi printer. L,a,b color and optical density values are then recorded before and after 48 hours of exposure In an Atlas Ci65 Xenon WeatherOmeter, inner and outer borosilicate filters, 50° C., 50% RH, irradiance 0.35 wm$^2$ at 340 nm.

Results are in the tables below.

| polymer | % loss of Optical Density | | delta E | |
|---|---|---|---|---|
| | 50% | 100% | 50% | 100% |
| AMBIENT CURE cyan | | | | |
| IG 8394 | 21 | 24 | 8.2 | 13.4 |
| IG 8396 | 18 | 21 | 8.5 | 11.1 |
| 279 K | 2 | 7 | 2.1 | 7.6 |
| magenta | | | | |
| IG 8394 | 5 | 5 | 4.0 | 2.7 |
| IG 8396 | 3 | 7 | 2.7 | 3.2 |
| 279 K | −3 | −4 | 4.3 | 2.6 |
| yellow | | | | |
| IG 8394 | 5 | −1 | 3.1 | 0.5 |
| IG 8396 | 3 | 3 | 1.5 | 1.9 |
| 279 K | 3 | 1 | 2.0 | 2.5 |
| OVEN CURE Cyan | | | | |
| IG 8394 | 18 | 25 | 8.1 | 14.1 |
| IG 8396 | 17 | 23 | 7.6 | 12.6 |
| 279 K | 1 | 11 | 2.3 | 9.1 |
| 1 MM | 3 | 8 | 3.4 | 6.9 |
| magenta | | | | |
| IG 8394 | 5 | 1 | 3.0 | 1.4 |
| IG 8396 | 5 | 2 | 3.2 | 1.7 |
| 279 K | −5 | 1 | 4.6 | 2.1 |
| 1 MM | −5 | 0 | 4.7 | 3.9 |
| yellow | | | | |
| IG 8394 | 3 | −2 | 1.0 | 2.7 |
| IG 8396 | 2 | 0 | 2.2 | 0.7 |
| 279 K | −5 | −2 | 3.9 | 0.6 |
| 1 MM | −2 | 3 | 1.2 | 1.6 |

The photo fade characteristics of images printed on coatings comprising the instant media polymers compare favorably to gelatin coatings. Overall diminished dye loss, and a more balanced color change across all three colors is observed for receptive layers comprising the present zwitterionic copolymers.

EXAMPLE 2

Dye Lightfastness

Aqueous solutions/suspensions of media polymers are applied to polyethylene coated paper sheet using the appropriate draw down bar to generate a 15 gsm (grams per square meter) coating after drying. The media polymer coatings are dried in an oven, 3 minutes at 180° F.

IMAGE GEL 8396 is a state of the art gelatin polymer for ink jet receptive media, available from Kind and Knox.

In the present Example, the polymers of this invention are acrylamide/methoxyPEG350 methacrylate/N,N-dimethyl-N-methacryloyloxyethyl-N-(3-sulphopropyl) ammonium betaine copolymers in an 60/25/15 w/w/w ratio. The present polymers are identified by their molecular weights: 250K (250,000).

Color sqares of yellow, magenta and cyan at both 50% and 100% optical densities are printed onto the coated papers using the HP 970 Cxi printer. Delta E values are then recorded after 24, 48 and 72 hours of exposure in an Atlas Ci65 Xenon WeatherOmeter, inner and outer borosilicate filters, 50° C., 50% RH, irradiance 0.35 wm² at 340 nm.

Certain coatings also contain glycerin, 10% by weight, and 2,2,6,6-tetramethyl-4-hydroxy-piperidin-1-oxyl (a hindered nitroxyl), at 1.5% by weight.

Results for delta E are in the tables below.

| polymer | 50% | | | 100% | | |
|---|---|---|---|---|---|---|
| | 24 h | 48 h | 72 h | 24 h | 48 h | 72 h |
| cyan | | | | | | |
| IG 8396 | 9.2 | 11.2 | 11.9 | 12.8 | 16.1 | 16.4 |
| 250 K | 6.4 | 10.1 | 10.9 | 11.5 | 17.1 | 16.1 |
| magenta | | | | | | |
| IG 8396 | 3.3 | 9.6 | 12.5 | 2.5 | 7.7 | 9.7 |
| 250 K | 7.1 | 21.9 | 27.8 | 7.4 | 14.7 | 18.6 |
| 250 K + glycerin + nitroxyl | 4.5 | 13.4 | 17.6 | 7.0 | 12.4 | 15.8 |
| yellow | | | | | | |
| IG 8396 | 2.0 | 7.4 | 9.0 | 4.3 | 11.3 | 13.7 |
| 250 K | 1.2 | 8.6 | 10.3 | 0.5 | 8.7 | 13.1 |
| 250 K + glycerin + nitroxyl | 0.6 | 3.9 | 6.0 | 0.7 | 5.2 | 8.8 |

This Example shows the advantageous effect of an added nitroxyl stabilizer.

EXAMPLE 3

Examples 1 and 2 are repeated where the zwitterionic monomer is replaced with a monomer selected from
N,N-dimethyl-N-acryloyloxyethyl-N-(3-sulfopropyl)-ammonium betaine,
N,N-dimethyl-N-acrylamidopropyl-N-(2-carboxymethyl)-ammonium betaine,
N,N-dimethyl-N-methacrylamidopropyl-N-(3-sulfopropyl)-ammonium betaine,
2-(methylthio)ethyl methacryloyl-S-(sulfopropyl)-sulfonium betaine,
2-[(2-acryloylethyl)dimethylammonio]ethyl 2-methyl phosphate,
2-(acryloyloxyethyl)-2'-(trimethylammonium)ethyl phosphate and
[(2-acryloylethyl)dimethylammonio]methyl phosphonic acid.

Excellent results are achieved.

EXAMPLE 4

Examples 1-3 are repeated, replacing acrylamide with a monomer selected from methacrylamide, methylmethacrylate, acrylic acid and hydroxyethylmethacrylate (HEMA). Excellent results are achieved.

EXAMPLE 5

Examples 1-4 are repeated where the ratio of nonionic monomer to zwitterionic monomer is adjusted from 85/15 to 5/95, 10/90, 15/85, 20/80, 25/75, 30/70, 35/65, 40/60, 45/55, 50/50, 55/45, 60/40, 65/35, 70/30, 75/25, 80/20, 90/10 and 95/5. Excellent results are achieved.

EXAMPLE 6

Examples 1-5 are repeated, where the ink receptive layer of the present invention further comprises gelatin and/or polyvinylalcohol. Excellent results are achieved.

EXAMPLE 7

Examples 1-6 are repeated, where the ink receptive layer of the present invention further comprises a cationic polymer, glycerin or a surfactant. Excellent results are achieved.

The invention claimed is:

1. An ink jet recording media system that comprises a support and one or more ink jet ink receptive coating layers thereon, wherein at least one ink receptive coating layer comprises a zwitterionic polymer or oligomer, where the zwitterionic polymer or oligomer is a copolymer or cooligomer of acrylamide and at least one zwitterionic monomer, in which the zwitterionic monomers are selected from the formulae

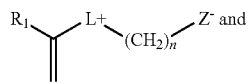 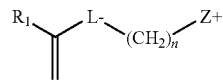

wherein
$L^+$ is a group of formula

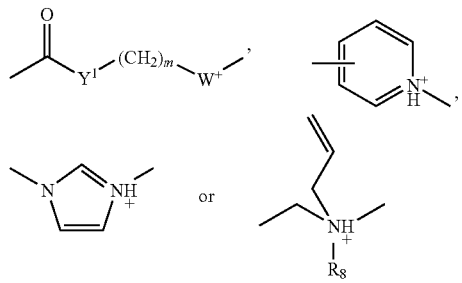

$L^-$ is a group of formula

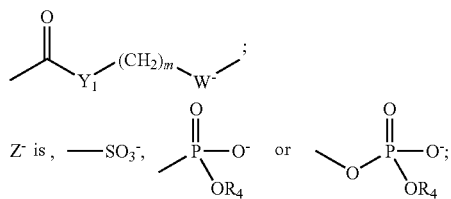

$Z^-$ is, 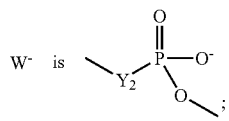

$Z^+$ is $-N^+R_5R_6R_7$;
$R_1$ and $R_8$ are independently hydrogen or methyl;
$W^+$ is $-S^+R_3-$ or $-N^+R_2R_3-$;

$W^-$ is $Y_1$ and $Y_2$ are independently selected from $-O-$ or $-NR_2$;
$R_2$, $R_3$, $R_4$, $R_5$, $R_6$ and $R_7$ are independently selected from hydrogen and straight or branched chain alkyl of 1 to 4 carbon atoms;
$m$ is 2 or 3; and
$n$ is 1-5; and where the polymer or oligomer optionally further comprises nonionic monomers selected from the group consisting of methacrylamide, N-methylacrylamide, N,N-dimethyl(meth)acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acrylate, N-vinyl-2-pyrrolidone, glycerol mono((meth)acrylate), 2-hydroxyethyl(meth)acrylate, vinyl methylsulfone, vinyl acetate, diacetone acrylamide, acrylate and methacrylate esters and acids and associative monomers.

2. A recording media system according to claim 1 in which the zwitterionic monomers are selected from monomers of the formulae

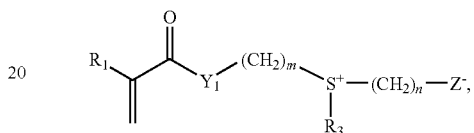

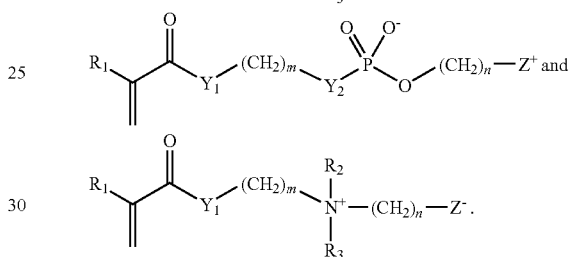

3. A recording media system according to claim 1 in which the zwitterionic monomers are selected from the group consisting of
N,N-dimethyl-N-acryloyloxyethyl-N-(3-sulfopropyl)-ammonium betaine,
N,N-dimethyl-N-methacryloyloxyethyl-N-(3-sulfopropyl)-ammonium betaine,
N,N-dimethyl-N-methacrylamidopropyl-N-(3-sulfopropyl)-ammonium betaine,
2-(methylthio)ethyl methacryloyl-S-(sulfopropyl)-sulfonium betaine,
2-[(2-acryloylethyl )dimethylammonio]ethyl 2-methyl phosphate,
2-(acryloyloxyethyl)-2'-(trimethylammonium)ethyl phosphate and
[(2-acryloylethyl)dimethylammonio]methyl phosphonic acid.

4. A recording media system according to claim 1 in which the zwitterionic polymer or oligomer is a copolymer or cooligomer of acrylamide and N,N-dimethyl-N methacrylamidopropyl-N-(3-sulfopropyl)-ammonium betaine or N,N-dimethyl-N-methacryloyloxyethyl-N-(3-sulfopropyl)-ammonium betaine.

5. A recording media system according to claim 1 which comprises an ink receptive coating layer directly on a support, wherein the coating layer comprises a zwitterionic polymer or oligomer.

6. A recording media system according to claim 1 wherein the at least one receptive layer further comprises at least one polymer selected from the group consisting of gelatin, starch, styrene butadiene rubber latex, nitrile butadiene rubber latex, polyethylene glycol, polyacrylamide, polyvinylalcohol, vinyl alcohol/vinyl acetate copolymer, methyl cellulose, hydroxymethyl cellulose, hydroxyethyl cellulose, hydroxypropy methyl cellulose, hydroroxypropyl ethyl cellulose, hydroxyethyl methyl cellulose, carboxymethyl cellulose, poly(N-vinyl pyrrolidone) and cationic polymers and
  there is optionally a barrier layer between the support and the receptive layer.

7. A recording media system according to claim 1 which further comprises a protective coating layer,
  wherein the protective coating layer optionally also comprises the zwitterionic polymer or oligomer; and
  there is optionally a barrier layer between the support and the ink jet ink receptive layer.

8. A recording media system according to claim 1 which further comprises one or more pigments, fillers or organic particulates selected from the group consisting of amorphous silica, crystalline silica, aluminum trihydrate, kaolin, talcum, chalk, betonite, zeolite, glass beads, calcium carbonate, potassium sodium aluminum silicate, diatomaceous earth, silicates of aluminum, silicates of magnesium, titanium doxide, polyolefins, polystyrene, polyurethane, starch, poly(methyl methacrylate) and polytetrafluoroethylene.

9. A recording media system according to claim 1 which further comprises one or more additives selected from the group consisting of surface active agents, antistatic agents, thickeners, suspending agents, pH controlling compounds, light stabilizers, antioxidants, humectants, bacteriostats, crosslinking agents and optical brighteners.

10. A recording media system according to claim 1 in which said support comprises cellulose esters, cellulose acetate, polyesters, polystyrene, polyethylene, poly(vinyl acetate), polypropylene, polycarbonate, polymethacrylic acid and methyl and ethyl esters, polyamides such as nylons, polyesters such as poly(ethylene terephthalate) (PET), polyimides, polyethers, polyvinyl chloride or polysulfonamides.

11. A recording media system according to claim 1 in which said support is paper or transparent poly(ethylene) terephthalate.

12. A recording media system according to claim 1 which comprises a nanoporous or microporous coating layer.

* * * * *